May 3, 1932. J. W. KROEF 1,856,343
APPARATUS FOR TRIMMING AND SPREADING GRAIN, ORE, AND THE LIKE
Filed March 7, 1929 2 Sheets-Sheet 2
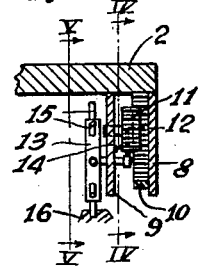
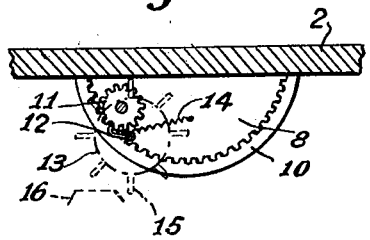
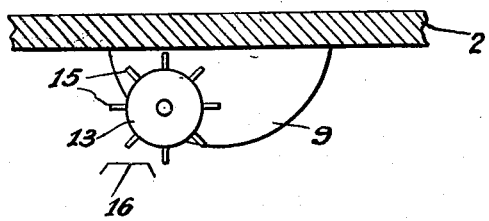
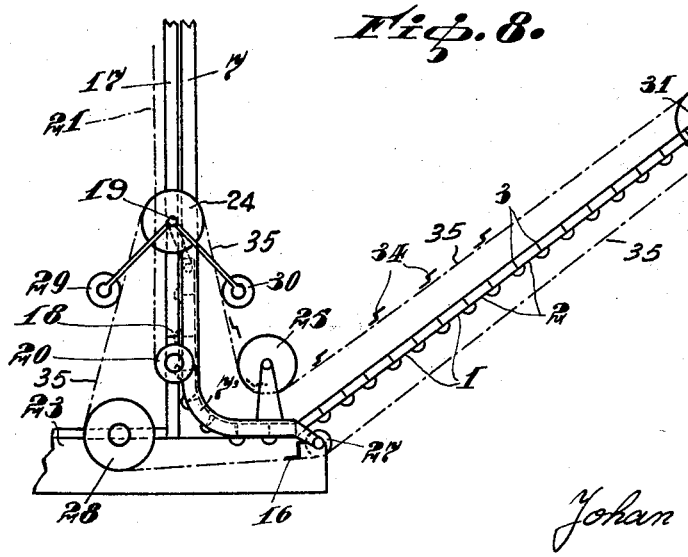
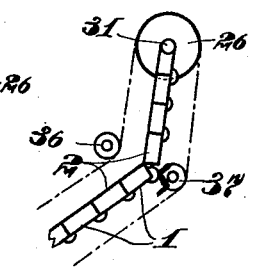

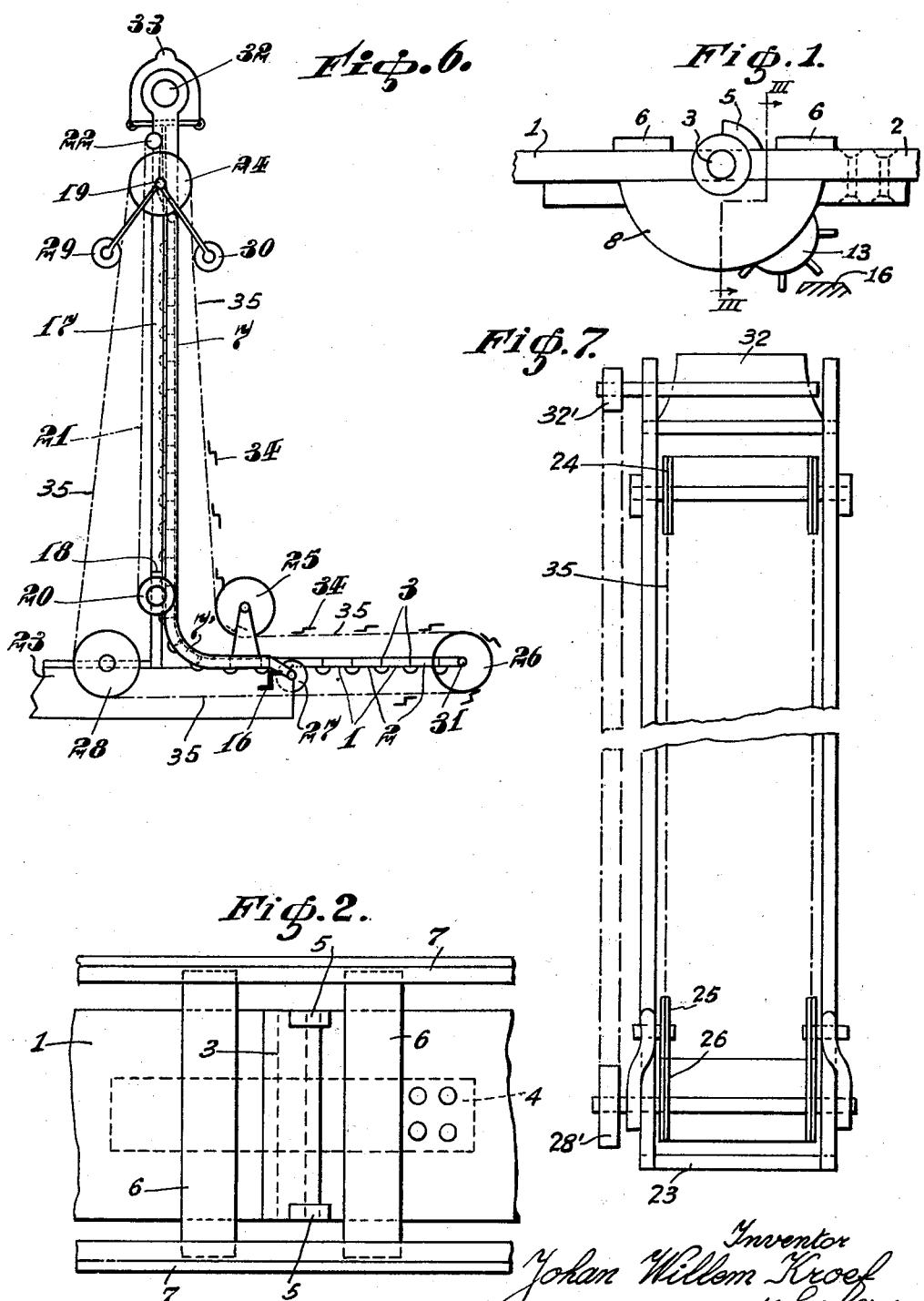

Patented May 3, 1932

1,856,343

UNITED STATES PATENT OFFICE

JOHAN WILLEM KROEF, OF ROTTERDAM, NETHERLANDS

APPARATUS FOR TRIMMING AND SPREADING GRAIN, ORE, AND THE LIKE

Application filed March 7, 1929, Serial No. 345,135, and in Belgium March 20, 1928.

The present invention relates to an apparatus for trimming and spreading grain, ore and the like, comprising in combination a frame and a movable adjustable framework for a conveyor structure formed with separate elements hinged together transversely to the direction of movement of the framework. The frame is provided with means for guiding and supporting said framework in various positions with relation to the frame and the free end of the framework is adapted to extend rigidly out of the frame in variable positions, and the rectangular elements can be steadied with relation to one another by means of particular locking devices. This framework is fitted with means for trimming and spreading.

The invention will be described with reference to the accompanying drawings in which:

Fig. 1 is a side elevation of the hinged connection between two adjacent elements constituting the adjustable framework for the conveyor structure;

Fig. 2 is a corresponding plan view;

Fig. 3 is a section on line III—III of Fig. 1;

Fig. 4 is a section on line IV—IV of Fig. 3;

Fig. 5 is a section on line V—V of Fig. 3;

Figs. 6 and 7 are respectively side and front elevations of the complete device for trimming and spreading, the means for transmitting the movement from the motor to the driving elements of the apparatus being left out in Fig. 6;

Fig. 8 is a side elevation showing the same apparatus with the conveyor structure in an operative position;

Fig. 9 is a view of a part of the conveyor structure outside of the frame.

Referring to Figs. 1 to 5, the adjustable framework for the conveyor structure is formed with rectangular elements or planks 1 and 2, hingedly connected at 3. The adjustable framework is formed by a numerous succession of such plates or planks. To the element 2 is bolted a rigid plate 4, freely resting against the adjacent element 1, so as to prevent downward swinging of the two elements. Said elements are arranged to swing upwardly with relation to one another, but a stop nose 5, supported by the element 2 and engaging the element 1, constitutes a limit to this upward swinging movement.

Adjacent the hinged connection, the elements have transverse bars 6, extending laterally, so as to engage a channel and guideway 7, which will be referred to hereafter. The elements 1 and 2 are provided at their hinged connection with a device acting as locking and unlocking construction, in view of steadying one element 2 to the other element 1 in a variable angular position. Such locking device is diagrammatically detailed, by way of example, in Figs. 3 to 5. The rectangular element 2 is provided with a semi-circular sector 8 and the rectangular element 1 is also provided with a semi-circular sector 9, both sectors being perpendicular to their respective supporting elements and in a plane perpendicular to the hinge 3. The sectors 8 and 9 having their centre coaxial with the hinge-spindle, they will register correctly; both elements 1 and 2 form one plane surface.

The sector 8 is provided with an inwardly toothed crown 10 engaged by a pinion 11, supported by the sector 9. The pinion 11 can be locked in a fixed position, by means of a ratchet pawl 12 supported by sector 9, at the end of the shaft of a disc 13. The disc 13 is provided at its periphery with radial spokes 15 and the pawl 12 is acted upon by a spring 14, the free end of which is fixed to sector 9 and which tends to draw said pawl in engagement with the pinion 11. During adjustment of the framework as described below, the spokes 15 engage a fixed surface 16 provided in the frame of the structure and this engagement causes the disc 13 to partially rotate, so as to disengage the pawl from the pinion 11, and in this position it is possible to vary the angular position of the element 2 with respect to the adjacent element 1, and the disc 13 having left the fixed surface 16, the pawl will automatically re-engage the pinion 11, so as to lock the two sectors and maintain rigidly the parts 1 and 2 in their position.

The adjustable framework formed with a succession of elements 1 and 2, each being provided with a locking and unlocking device, if desired on both sides of the elements, will be freely suspended from a movable part of the frame construction, particularly illustrated in Figs. 6 to 8.

The frame presents in lateral elevation, the general form of an inverted T and affords a vertical guide-way 17, supported by the base 23. In this guide-way 17 can move an axle 19, from the upper end to the lower stop point 18, and a winch 20 with its cable 21 passing over a pulley 22 and attached to the axle 19 allows the shifting of the axle 19 in variable positions. The axle 19 bears the chain wheels 24 and the guide rollers 29 and 30, whereas the frame 23 supports the chain wheels 25 and 28, as also the guiding rollers 27.

The adjustable framework is freely suspended from the axle 19 and is guided in the guide-way 7, by means of its laterally extended transverse bars 6 as explained above. This guide-way 7 extends partly vertically and partly horizontally, the parts being connected by a curved portion 7' and one end of the framework 1, 2 extends freely in front of the frame. This free end of the framework bears an axle 31 for chain wheels 26. Endless chains 35 are arranged over the chain wheels and rollers 24 to 30 and bear transverse forks, rakes or paddles 34. The length of said forks or rakes is obviously less than the width separating the endless chains and such elements will be pivoted in the respective links of the chains for the purpose of clearing their passage intermediate the pulleys and rollers. The axle of the chain wheels 28 can be positively driven from a motor 32, by means of a belt passing over pulleys 32' and 28' (Fig. 7), so that the apparatus can act as a trimming or spreading device, by means of the continuously moving forks 34. Such apparatus can be advantageously used, for instance, in the holds of steamers, in which the apparatus can be lowered and suspended by its loop 33 from the cable of a crane.

The outwardly extending part of the adjustable framework 1, 2 can be of variable length and occupy a variable angular position with respect to the frame. This is shown in Fig. 8, in which the axle 19 has been lowered and the projecting portion of the framework inclined, such inclination being obtained by lifting the end shaft 31 progressively as the elements of the framework leave the frame after passing the abutment or fixed surface 16, which will act upon the locking device and allow the angular adjustment of the parts 1 of the framework with respect to the parts 2.

Obviously, the separate adjustment of the elements 1 and 2 can be manually operated and the abutment 16 dispensed with, by turning the disc 13, so as to disengage the pawl. On the other hand, a number of fixed surfaces 16 may be used to act as suitable points to vary the direction of movement of the framework a number of times, as shown by way of example in Fig. 9. When the free end of the framework has again to be inclined at another angle to the horizontal, as shown in Fig. 9, guiding rollers or pulleys 36, 37, supported by any fixed part of the hold or space where the apparatus is used, must be provided.

I claim:

In a trimming and spreading device comprising a frame, a movable adjustable framework formed with separate rectangular elements, hinge bolt connections between the successive elements arranged transversely to the direction of movement of the framework, an endless conveyor structure supported by the adjustable framework, means for guiding said framework, and means for steadying the relative position of the rectangular elements comprising a toothed sector coaxial with the hinge bolt connecting two adjacent elements, a pinion supported by one of the adjacent elements and engaging said toothed sector, a pawl engaging said pinion and a disc with peripheral spokes engaging a fixed surface, so as to disengage the pawl from the pinion, substantially as described.

In testimony whereof I signed hereunto my name.

JOHAN WILLEM KROEF.